United States Patent Office — 3,595,896
Patented July 27, 1971

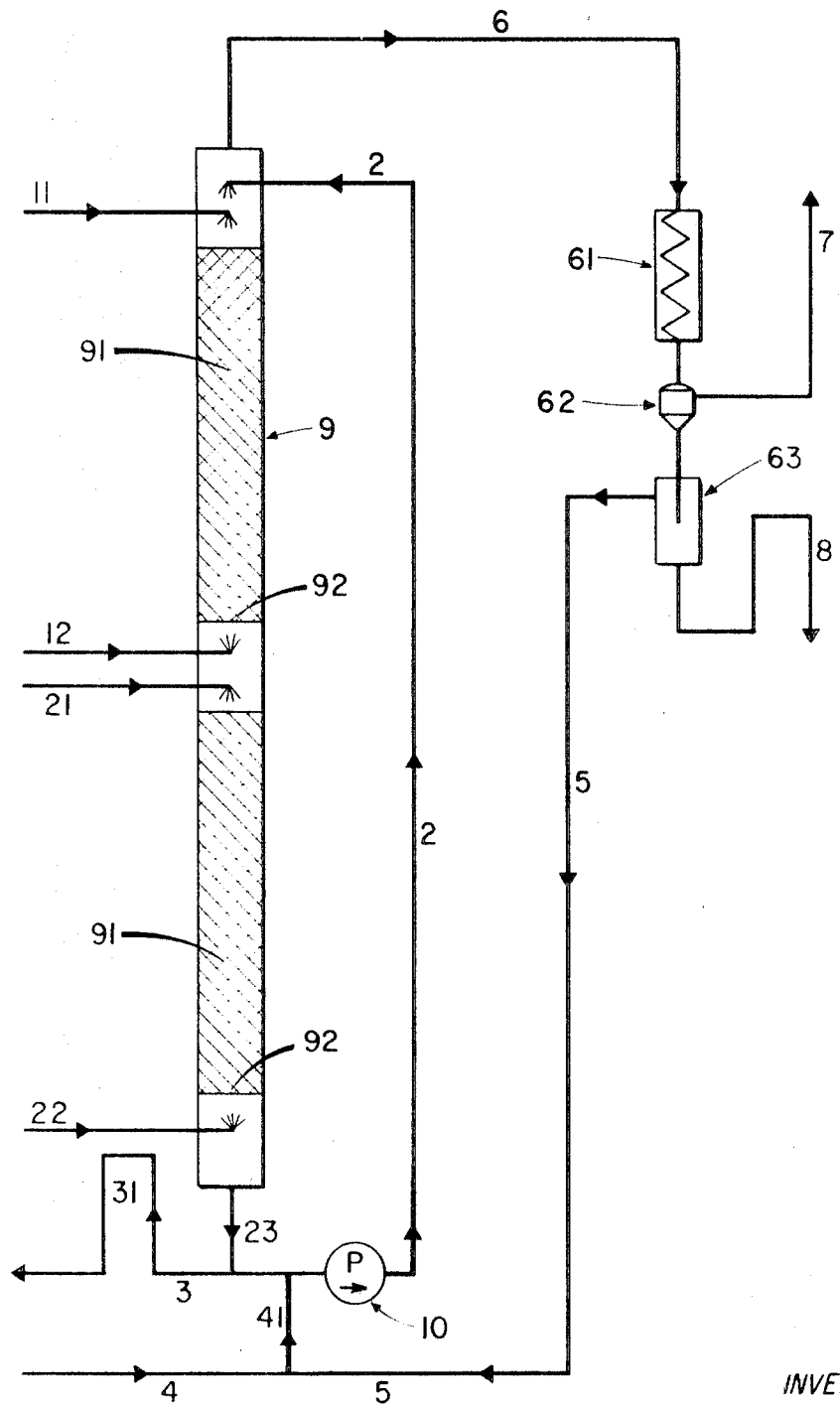

3,595,896
METHOD FOR THE HYDROLYSIS OF ORGANOHALOGENOSILANES

Siegfried Nitzsche, Ferdinand Gerstner, and Rudolf Strasser, Berghausen, Upper Bavaria, Germany, assignors to Wacker-Chemie G.m.b.H., Munich, Bavaria, Germany
Filed Aug. 15, 1969, Ser. No. 850,513
Claims priority, application Germany, Aug. 20, 1968,
P 17 95 182.5
Int. Cl. C07f 7/02; C08g 31/38
U.S. Cl. 260—448.2E                13 Claims

ABSTRACT OF THE DISCLOSURE

A continuous method for hydrolyzing halogenosilanes wherein the water employed for hydrolysis is admixed with silane hydrolyzates and acts as a scrubbing stream on the halogenosilanes.

---

This invention relates to a novel method for continuous hydrolysis of organohalogenosilanes.

The known methods for hydrolyzing organohalogenosilanes include continuous hydrolysis procedures and employ halogenosilane mixtures containing up to 90 percent by weight of organosilicon compounds wherein the silanes have one or two halogen atoms per silicon atom and at least one organic radical bonded to silicon through an Si—C linkage. Particularly important is the hydrolysis of dimethyldichlorosilane to produce dimethylsiloxane polymers. The known methods suffer several disadvantages.

When organic solvents which are completely miscible with water and with the organohalogenosilanes are employed to insure adequate mixing and contact between the water and the organohalogenosilanes, one encounters difficulty and unwarranted expense in obtaining complete separation of the organic solvent or removal of the solvent from the hydrolyzate. When the organohalogenosilanes are employed in vaporous form in the known methods of hydrolysis, great difficulty is encountered in controlling the proper proportions of reactants within the reaction zone. The losses of unhydrolyzed organosilanes carried along by the exit stream of hydrogen halide (HCl) formed during the hydrolysis as well as the losses of product resulting from insufficient condensation of the silanol and siloxanol groups formed during hydrolysis and carried along in the water layer separated from the product is also an economic waste adding to the inefficiency and expense of current methods of hydrolyzing organohalogenosilanes. In addition, excessive condensation of the hydrolyzate can produce siloxane products having viscosities higher than desired. It is also apparent that continuous hydrolysis of organohalogenosilanes produces large amounts of hydrogen halide (HCl) which will dissolve in the water present to produce hydrochloric acid which can attack the pumps and other equipment employed, thus necessitating the use of special and expensive equipment resistant to HCl attack. Further, it is also necessary to circulate large amounts of water through the system to dissolve and dilute the hydrogen halide gas and at the same time disperse the large amount of heat. This, of course, requires expenditures for energy and equipment to circulate the water. Finally, the splitting of cyclic organopolysiloxanes formed and returned during the hydrolysis in accordance with known methods is not efficient or rapid enough for a continuous process.

It is an object of this invention to introduce a novel method for hydrolyzing organohalogenosilanes in a continuous process avoiding the difficulties noted above and providing an economically feasible and practical continuous hydrolysis system.

The present invention is based on the unexpected discovery that at temperatures of at least 100° C., the hydrolyzates of organohalogenosilanes will dissolve and carry water as well as organohalogenosilanes. This permits adequate mixing and contact between the water and the organohalogenosilanes within the hydrolyzate system to accomplish the desired hydrolysis reaction.

This invention is a method for hydrolyzing halogenosilanes containing at least 90 percent by weight of organosilicon compounds wherein the silicon valences are satisfied by one or two halogen atoms and at least one organic group bonded to silicon through an Si—C linkage, employing water wherein the hydrolysis is carried out at a temperature in the range from 100° to 180° C. and the total quantity of water employed for the hydrolysis of the organohalogenosilanes is dissolved in hydrolyzates of organohalogenosilanes before the water is brought into contact with the silanes to be hydrolyzed and the silanes to be hydrolyzed are also dissolved, at least in part, in hydrolyzates of organohalogenosilanes prior to the hydrolysis. In short, both the water and the organohalogenosilanes are dissolved, at least in part, in a hydrolyzate of an organohalogenosilane before the hydrolysis reaction is carried out.

It is very surprising that at the temperatures of 100° to 180° C., employed herein, the organosilanols and organosiloxanols formed and employed are not condensed to high viscosity siloxane fluids which are not desired at this point in the production scheme.

The organosilicon compounds which can be hydrolyzed in accordance with this invention are well-known materials. The widely used organosilanes employed herein can be represented by the general formulae $$R_mH_n(R'O)_pSiX_{4-m-n-p} \text{ and } XR_2SiR''SiR_2X$$

where X is Cl, Br or I, preferably Cl, R is a monovalent hydrocarbon or substituted hydrocarbon radical, R' is a monovalent hydrocarbon or substituted hydrocarbon radical or an acyl radical and R″ is a divalent hydrocarbon or substituted hydrocarbon radical, m is 1, 2 or 3, preferably 2, n and p are 0 or 1 and the sum of m+n+p is 2 or 3. The radicals represented by R include alkyl radicals, cycloalkyl radicals, alkenyl radicals, cycloalkenyl radicals, aryl radicals, aralkyl radicals, alkaryl radicals, cyanoalkyl radicals and halogenated derivatives of the foregoing as is well known in the silane art (see e.g., U.S. Pats. Nos. 2,486,162 and 2,719,859, among others). R' can be any of the radicals set forth above for R and in addition can be an acyl radical such as acetyl or propionyl. The divalent hydrocarbon radicals represented by R″ can be illustrated by —CH$_2$—, —C$_2$H$_4$—, phenylene and polymethylene.

As is well known, the most important commercial siloxane products are based largely on diorganopolysiloxanes and particularly on dimethylpolysiloxanes which may contain copolymerized therewith vinylmethylsiloxanes, phenylmethylsiloxane, diphenylsiloxane and/or 3,3-trifluoropropylmethylsiloxane units with or without triorganosiloxane endblocking units such as trimethylsiloxy, dimethylvinylsiloxy, methylphenylvinylsiloxy and dimethyl(3,3,3-trifluoropropyl)siloxy units (i.e., Z$_3$SiO$_{1/2}$ where Z is —CH$_3$, —C$_6$H$_5$—, CH$_2$=CH— or CF$_3$CH$_2$CH$_2$— units). It is also well known the most common of the hydrolyzable silanes are chlorosilanes. Accordingly, the most commonly employed silane set forth in this invention is dimethyldichlorosilane. It is obvious, however, the method of this invention is generally applicable to other organosilicon compounds having at least one organic radical bonded directly to silicon via Si—C bonding and one or two halogen atoms per molecule. Examples of other organosilicon compounds which can be hydrolyzed herein include MeViSiCl$_2$, PhMeSiCl$_2$, Vi$_2$SiCl$_2$, Ph$_2$SiCl$_2$, MeHSiCl$_2$, Me$_3$SiCl and ViMe$_2$SiCl, wherein Me, Vi and Ph represent methyl, vinyl and phenyl radicals, respectively.

The organosilicon compounds hydrolyzed in accordance with this invention can contain up to 10 percent by weight of silanes having more than two halogen atoms per silicon atom and/or no organic groups bonded directly to silicon. Such silanes include SiCl$_4$ and MeSiCl$_3$ in particular. When more than 10 percent by weight of such silanes are present, the hydrolysis reaction will produce cross-linking and gelation of the product polymers and the equipment will become blocked.

The quantity of water employed for the hydrolysis reaction is in the range from one-half gram mol to four gram mols of water per gram atom of halogen present in the silane to be hydrolyzed. When less than one-half gram mol of water is employed, then some of the halogen atoms will not be reacted. When more than four gram mols of water are present per gram atom of halogen, it requires an undesirable and unnecessarily large amount of heat to vaporize the undissolved water. It is preferred to employ 0.75 to 1.25 gram mols of water per gram atom of halogen in the silane to insure complete hydrolysis at a minimum cost.

The hydrolysis reaction is carried forward at a temperature in the range from 100° to 180° C. and preferably at 110° to 140° C. The solubility of water in the silane hydrolyzates is found to be maximized within this range of temperatures.

The water employed to hydrolyze the halogenosilanes is dissolved in a hydrolyzate of the organohalogenosilane. Thus, when the silane to be hydrolyzed is dimethyldichlorosilane, the water is dissolved in the hydrolyzate of such silane which is a low molecular weight hydroxylated dimethylpolysiloxane and when the silane to be hydrolyzed is a mixture of 99 mol percent dimethyldichlorosilane and 1 mol percent trimethylchlorosilane, the water is dissolved in the hydrolyzate of 99 mol percent Me$_2$SiCl$_2$ and 1 mol percent Me$_3$SiCl which is a low molecular weight hydroxylated copolymer of 1 mol percent trimethylsiloxy and 99 mol percent dimethylsiloxane units. Similarly, the silane to be hydrolyzed is dissolved, at least in part, in the hydrolyzate and again referring to the hypothetical situations suggested above, when the hydrolysis involves Me$_2$SiCl$_2$, said silane is dissolved and carried in the dimethylsiloxane hydrolyzate and when the hydrolysis involves 99 mol percent Me$_2$SiCl$_2$ and 1 mol percent Me$_3$SiCl, the mixture of chlorosilanes is dissolved in the trimethylsiloxydimethylsiloxane hydrolyzate. The solutions of water in hydrolyzate and silane in hydrolyzate can be prepared in the vessels wherein the hydrolysis reaction is carried forward or either or both solutions can be prepared in separate vessels and the solutions carried to the reaction zone through pumps and conduits. In any case, the water or the organohalogenosilane or both can be employed in either gas or liquid phase in the reaction.

The continuous hydrolysis reaction can be carried forward in any desired reaction vessel or system but it is preferred to employ a reaction tower. The reaction towers preferably contain grids or fillers or other mechanical systems for insuring formation of solutions more certain and easier. Fillers such as Raschig rings, Burl saddles and similar packing materials retained in the vessel by supporting grids are conventional for the hydrolysis procedure of this invention.

A portion of the organopolysiloxane produced by the hydrolysis reaction of the present invention can be recycled through the apparatus, if desired, after separation of a portion of the cyclic organopolysiloxane, assuming the cyclic siloxane is the desired product, or after separation of a portion of the linear siloxane product if this is the desired product. Alternatively, some of the siloxane produced by the hydrolysis reaction can be mixed with cyclic siloxanes from silanes of the type employed in the particular hydrolysis reaction and the mixture can be employed for preparation of the solutions to be fed to the hydrolysis reaction zone.

When cyclic organopolysiloxane products are recycled with the hydrolyzates and thus come into contact with all of the materials in the reaction zone and particularly with the hydrogen halide formed during the hydrolysis of halogenosilanes, at the reaction temperature (i.e., 100° to 180° C.), the cyclics are cleaved and reform to establish an equilibrium mixture of cyclic and linear siloxanes. This cleavage or splitting of the cyclic siloxanes, frequently referred to as equilibration, has previously been carried forward in discontinuous fashion in separate apparatus and the simultaneous splitting of cyclic siloxanes with the hydrolysis reaction represents a substantial savings in time and money and improvement in equipment efficiency. In order to prevent undesired high viscosity in the organopolysiloxanes obtained herein and to avoid stoppage or plugging of the reaction vessels and conduits, the weight ratio of non-cyclic organopolysiloxanes to the cyclic organopolysiloxanes in the recycled hydrolyzates should be within the range of 1/9 to 19/1 on a weight basis. The introduction of cyclic organopolysiloxanes in this recycle system in order to establish the desired ratio of non-cyclic organopolysiloxanes to the cyclic organopolysiloxanes in the cycled hydrolyzate can be accomplished in the hydrolysis vessel or tower or at some other point in the cycle, as desired. Expediently, the cyclic organopolysiloxanes are added to the hydrolysis cycle in the same proportion in which they are present in the hydrolysis product or by processing the organopolysiloxane taken from the cycle. In determining and establishing the ratio of the non-cyclic organopolysiloxanes to the cyclic organopolysiloxanes in the hydrolyzates conducted into the cycle, which may be accomplished primarily through the choice of the quantity ratios or proportions of organosilane and water incorporated, the viscosity of the final non-cyclic organopolysiloxanes obtained will also be regulated. The lower the ratio of non-cyclic to cyclic organopolysiloxanes in the feed, the lower the viscosity of the final non-cyclic organopolysiloxane product.

If desired, the hydrolyzates can be brought into contact with solid, siloxane bond rearranging catalysts such as cation exchange resins including H-form resins, diatomaceous earth or activated carbon, with acid or base groups, in order to accelerate the establishment of the equilibrium between cyclic and non-cyclic organopolysiloxanes. This can be accomplished within the hydrolysis reaction vessel or at some site within the cycle outside the hydrolysis reaction vessel or both within the vessel and at one or more sites outside the vessel and within the cycle.

The method of this invention and the process equipment required to carry out the method are extremely simple. One or more pumps are required to accomplish delivery of the water-hydrolyzate and silane-hydrolyzate solutions to the reaction zone and to recycle the organopolysiloxanes yielded by the hydrolysis but no other moving parts are required. The pump employed can be considerably smaller than the pumps required in previous methods for hydrolyzing silanes because the volume of water required is less than was required under other methods. Further, the pump does not come into contact with the aqueous hydrogen chloride or other hydrogen halide as in previous methods, hence, special materials are not required in the pump construction.

The hydrogen halide produced in the hydrolysis reaction of this invention is not dissolved in the water employed and 70 to 92 percent by weight of the hydrogen halide formed is removed from the reaction cycle in gaseous form and in a very pure state. This highly desirable gaseous hydrogen halide does not require cleaning before further use in chemical synthesis reactions. The small amount of hydrogen halide formed during the reaction and taken up in the excess water employed for hydrolysis is obtained in the form of concentrated aqueous hydrogen halide and is practically free of organosilicon compounds or can easily be freed from such compounds.

The yields of organopolysiloxanes obtained in accordance with this invention are excellent and can exceed 99 percent of the theoretical yield.

The hydrolysis reaction of this invention can be carried out at any desired pressure but there is no advantage in super-atmospheric or sub-atmospheric pressure in the reaction zone, hence, simplicity, efficiency and cost factors suggest carrying the reaction forward under atmospheric pressure.

In the attached drawing, an apparatus for the preferred procedure and process equipment of the present invention is shown in diagrammatic form.

The reaction tower 9 may be equipped with means to heat the reaction zone and may be equipped against heat radiation. Fluid water is introduced into the tower 9 through conduit 11 or vaporous water through conduit 12 and fluid organohalogenosilane or mixture of such silanes is introduced into the tower 9 through conduit 21 or gaseous organohalogenosilane or mixture of such silanes through conduit 22. If desired, the tower 9 need not be equipped with means for heating the reaction zone but then the reactants must be preheated prior to introduction into the tower 9 and means outside the tower 9 for such preheating will be required. The tower 9 serves, among other things, as the hydrolysis reaction vessel and is packed with fillers 91 or other elements 91 to enlarge the surface area (as shown by the cross-diagonals) and the packing material (filler or other elements 91) is supported and held in place by grids 92. Organosilane hydrolyzate is conducted into the tower 9 through conduit 2 above conduit 11 in order to get the solution of water in hydrolyzate desired herein. The organohalogenosilane is dissolved in the hydrolyzate immediately as the hydrolyzate is formed during the hydrolysis reaction in the lower part of the tower. This hydrolyzate is cycled by the pump 10 and is part of the sump runoff leaving the tower 9 through conduit 23. The other portion of the sump runoff is directed through conduit 3 into which the conduit piece 31, which is U-shaped and bent perpendicularly upward to regulate the level of the sump in tower 9, for further processing for the use of the organopolysiloxanes. At least a portion of the cyclic organopolysiloxanes resulting from this processing and/or, if desired, the non-cyclic organopolysiloxanes resulting from the processing, can be mixed with the hydrolyzates which, as already mentioned, are moved through pump 10 via conduit 4 and conduit 41 and are again conducted into the tower 9 in the vicinity of the head of the tower 9.

The gaseous materials leaving at the head of the tower 9, i.e. hydrogen halide, low boiling organopolysiloxanes and possibly some water, reach the condenser 61 through conduit 6 and then flows to gas separator 62. The hydrogen halide is separated in the gaseous separator 62 and removed through conduit 7. The condensate leaving the gas separator 62 is conducted to separating vessel 63 and flows off through conduit 8. The organopolysiloxanes remaining after this separation are mixed with the hydrolyzates conducted into the reaction cycle through conduit 5 and conduit 41.

The following examples are intended to assist in gaining a full understanding of this invention and are not intended to restrict the scope of the invention which is delineated in the claims. The boldface numbers in the examples are reference numerals to the drawing.

EXAMPLE 1

Two perpendicular glass tubes connected and forming a long tubular reaction zone open at top and bottom into conduits 23 and 6 serve as the reaction tower 9. The two glass tubes, including the connecting piece between them and opening into conduit 12 have a total length of 2,450 mm. and have an inside diameter of 55 mm. The tubes are surrounded by a heating jacket and are partially filled with 6 mm. Raschig rings as fillers 91 held in place on a grid 92. A conduit 2 opens into the tower 9 100 mm. below the upper end and a conduit 22 opens into the tower 9 100 mm. above the lower end. A conduit 23 is connected to another conduit 3 wherein the highest point of a perpendicular U-shaped portion 31 is bent upward and at its highest point is 5 mm. below the level of entry of conduit 22 into the tower 9. The conduit 23 is also connected to conduit 41 and leads to a continuously regulatable membrane pump 10 from which conduit 2 conducts fluid into the reaction zone at the top of tower 9.

Conduit 6 carries gases overhead from the reaction tower 9 to glass condenser 61 which is connected to a gas separator 62 from which gaseous hydrogen chloride is removed through conduit 7. The fluid runoff from the gas separator 62 flows into a separating vessel 63 which is fitted with an overflow conduit 5 and a bottom runoff conduit 8. The bottom runoff conduit 8 from the vessel 63 contains a U-shaped conduit piece bent upward with a regulatable height in order to regulate and control the fluid level in the separating vessel 63. The overflow conduit 5 from vessel 63 connects to conduits 4 and 41 thence to pump 10 for recycling.

A mixture of low boiling dimethylpolysiloxanes essentially free of acids and bases, i.e., a mixture of essentially cyclic dimethylpolysiloxanes, having a viscosity of about 3 cs. at 25° C. was filled into the tower 9 through conduits 4, 41 and 23 in quantity such that when the pump 10 is running no dimethylpolysiloxane runs off over conduit piece 31 [i.e., the sump at the bottom of tower 9 is filled to below the upper level of the U-shaped conduit piece 31]. The heating jacket around the tower 9 is adjusted to a temperature of 125° C. and the output of the pump 10 is set at 17 liters per hour. 125 g. of water vapor per hour is conducted into the tower 9 in uniform streams through conduit 12 and at the same time 300 g. per hour of gaseous dimethyldichlorosilane is conducted into the bottom of the reaction tower 9 through conduit 22. A few minutes after the beginning of the introduction of water vapor and dimethyldichlorosilane into the tower 9, the condensation of a fluid is noted in condenser 61. This fluid separates in the separating vessel 63 to form a clear lower layer consisting of concentrated hydrochloric acid and a slightly turbid upper layer consisting of organopolysiloxane.

Approximately 1 hour after the initiation of introduction of water vapor and dimethyldichlorosilane into the reaction tower 9, hydrolyzate begins to run off through conduits 23 and 3 and over the U-shaped conduit piece 31. From this product of the hydrolysis reaction, low boiling, essentially cyclic dimethylpolysiloxanes are obtained and are distilled off with water vapor at 112° C. at 720 mm. of Hg (abs.) and after separating off the aqueous phase going over from this distillation at the same time, the cyclic dimethylpolysiloxanes are recycled through the tower 9 through conduits 4 and 41 and the pump 10.

After about 72 hours of operation, the following equilibrium has been established, i.e., the following results are obtained from a procedure according to the conditions of the present invention:

413 g. per hour of hydrolyzate run off through conduit 3 containing 40 g. of hydrogen chloride per kg. and up to 55 percent by weight, corresponding to 226 g. per hour of low boiling, essentially cyclic dimethylpoylsiloxanes which go over during the water vapor distillation. The quantity of non-cyclic dimethylpolysiloxanes remaining after water vapor distillation and freed of hydrochloric acid is 170.5 g./hour. This non-cyclic dimethylpolysiloxane product has a viscosity of 301 to 335 cs. at 25° C. and contains 0.6 percent by weight Si-bonded hydroxyl groups. The yield of non-cyclic dimethylpolysiloxane finally obtained is 99 percent of theory. In addition, 226 g./hour of 37 percent by weight hydrochloric acid is obtained from separating vessel 63.

EXAMPLE 2

The apparatus described in Example 1 is employed herein with the following modifications. Conduit 12 is closed and conduit 11 opening about 25 mm. below the upper end of tower 9 is opened for introduction of water into the reaction tower 9. Conduit 22 is closed and conduit 21 is opened into the area where the two glass tubes forming tower 9 are joined.

The apparatus is operated as in Example 1 with the following changes. 72 g./hour of fluid water rather than 125 g./hour of water vapor is conducted into the reaction tower 9 through conduit 11. 260 g./hour of fluid $Me_2SiCl_2$ in place of the 300 g./hour of gaseous $Me_2SiCl_2$ are introduced into the reaction tower 9 through conduit 21 rather than conduit 22.

After 3 days of operation, the system had reached equilibrium with the following results. 259.5 g./hour of hydrolyzate was removed from the sump through conduits 23 and 3 and over U-shaped conduit 31. This hydrolyzate produced contained 42 g. of hydrogen chloride per kg. of hydrolyzate and 102 g./hour (41 percent by weight) of the hydrolyzate was dimethylpolysiloxanes coming over after water vapor distillation and recycled into the tower 9, through 4 and 41. The amount of non-cyclic dimethylpolysiloxane obtained after steam distillation is 147.2 g./hour. This non-cyclic dimethylpolysiloxane has a viscosity of 600 to 650 cs. at 25° C. and contains 0.5 weight percent hydroxyl groups bonded to Si. The ultimate yield of dimethylpolysiloxane is 99 percent of theory.

EXAMPLE 3

The apparatus as described in Example 1 and the procedure described in Example 1 are employed herein.

200 g./hour of water vapor is introduced into tower 9 through conduit 12 and 420 g./hour of gaseous $Me_2SiCl_2$ is introduced into tower 9 through conduit 22. After about two days of operation, the portion of organopolysiloxane in the cycle, which go over during steam distillation, reaches about 90 percent by weight. Then the water vapor feed is increased to 300 g./hour and the $Me_2SiCl_2$ feed is increased to 630 g./hour of gaseous $Me_2SiCl_2$ and after 3 days the following equilibrium was reached:

Hydrolyzate runs off through conduits 23 and 3 and over U-shaped conduit 31. The hydrolyzate contains up to 90 percent of essentially cyclic dimethylpolysiloxanes going over when the hydrolyzate is steam distilled and recycled through the tower 9. The non-cyclic, essentially linear dimethylpolysiloxane product was obtained in amounts of about 118.7 g./hour and had a viscosity of 70 to 81 cs. at 25° C. and contained 1.9 percent by weight of Si-bonded hydroxyl groups. The yield of dimethylpolysiloxane ultimately achieved was 99 percent of theory.

That which is claimed is:

1. A method for hydrolyzing organohalogenosilanes comprising contacting
   (A) a hydrolyzable organohalogenosilane containing one or two halogen atoms per silicon atom and at least one Si—C bonded organic radical with
   (B) water, at a temperature in the range from 100° to 180° C., the water (B) being dissolved in
   (C) hydrolyzates of the organohalogenosilane employed, before the water comes into contact with the organohalogenosilane (A) and the organohalogenosilanes (A) being at least partially dissolved in (C) hydrolyzates of the organohalogenosilane employed before coming into contact with the water (B).

2. The method of claim 1 wherein the water (B) and organohalogenosilane (A) are dissolved in hydrolyzate which comes out of the hydrolysis and is recycled through the hydrolysis reaction.

3. The method of claim 1 wherein the recycled siloxane hydrolyzates contain non-cyclic as well as cyclic organopolysiloxanes in a weight ratio of non-cyclic to cyclic in the range from 1/9 to 19/1.

4. The method of claim 1 wherein the organohalogenosilanes employed are defined by the general formula $R_mH_n(R'O)_pSiX_{4-m-n-p}$ or the general formula $$XR_2SiR''SiR_2X$$

where X is Cl, Br or I, R is a monovalent hydrocarbon or substituted hydrocarbon radical, R' is an acyl radical, a monovalent hydrocarbon or substituted hydrocarbon radical, R'' is a divalent hydrocarbon or substituted hydrocarbon radical, $m$ is 1, 2 or 3, $n$ is 0 or 1, $p$ is 0 or 1, and $m+n+p$ is 2 or 3.

5. The method of claim 1 wherein the organohalogenosilane is dimethyldichlorosilane or a mixture of dimethyldichlorosilane and the trimethylchlorosilane.

6. The method of claim 1 wherein the water employed for hydrolysis amounts to from 0.5 gram mol to 4.0 gram mol of water for each gram atom of halogen present in the organohalogenosilane to be hydrolyzed.

7. The method of claim 6 wherein the hydrolysis is carried forward at a temperature in the range 110° to 140° C.

8. A method for hydrolyzing (A) organohalogenosilanes of the general formula $R_mH_n(R'O)_pSiX_{4-m-n-p}$ where R is a monovalent hydrocarbon radical, R' is a monovalent hydrocarbon or acyl radical, X is Cl, Br or I, $m$ is 1, 2 or 3, $n$ is 0 or 1, $p$ is 0 or 1, $m+n+p$ is 2 or 3, comprising at least partially dissolving the organohalogenohalosilane (A) in (C) hydrolyzate of said silane and dissolving (B) water in (C) hydrolyzate of said silane, contacting the silane (A) dissolved in hydrolyzate (C) with water (B) dissolved in hydrolyzate (C) at a temperature in the range from 100° to 180° C., the water (B) being employed in quantity to provide 0.5 gram mol to 4.0 gram mol of water per gram atom of halogen present in the organohalogenosilane (A).

9. The method of claim 8 wherein the product of the hydrolysis reaction is separated and the cyclic polysiloxanes produced are recycled through the hydrolysis reaction.

10. The method of claim 8 where $m$ is 2, $n$ is 0 and $p$ is 0.

11. The method of claim 10 wherein R is methyl and X is chlorine.

12. The method of claim 8 wherein R is methyl, X is chlorine, $m$ is 2 or 3, $n$ is 0 and $p$ is 0.

13. The method of claim 8 wherein the reaction is carried forward at 110° to 140° C.

References Cited
UNITED STATES PATENTS

| | | | |
|---|---|---|---|
| 2,758,124 | 8/1956 | Schwenker | 260—448.2E |
| 2,832,794 | 4/1958 | Gordon | 260—448.2E |
| 3,389,114 | 6/1968 | Burzynski et al. | 260—448.2EX |
| 3,433,758 | 3/1969 | Thomas | 260—448.2EX |
| 3,435,001 | 3/1969 | Merrill | 260—448.2EX |
| 3,450,672 | 6/1969 | Merrill | 260—448.2EX |
| 3,479,316 | 11/1969 | Levene | 260—448.2EX |
| 3,489,782 | 1/1970 | Pruvost et al. | 260—448.2E |

TOBIAS E. LEVOW, Primary Examiner

P. F. SHAVER, Assistant Examiner

U.S. Cl. X.R.

260—46.5R